Nov. 4, 1958        E. T. LORIG        2,859,076
ROLLER BEARING

Filed Sept. 27, 1955                3 Sheets-Sheet 1

INVENTOR:
EDWIN T. LORIG,
BY: *Donald G. Dalton*
his Attorney.

Nov. 4, 1958 E. T. LORIG 2,859,076
ROLLER BEARING
Filed Sept. 27, 1955 3 Sheets-Sheet 2

INVENTOR:
EDWIN T. LORIG,
BY: Donald H. Dalton
his Attorney.

Nov. 4, 1958   E. T. LORIG   2,859,076
ROLLER BEARING
Filed Sept. 27, 1955   3 Sheets-Sheet 3
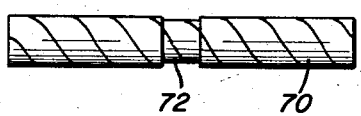
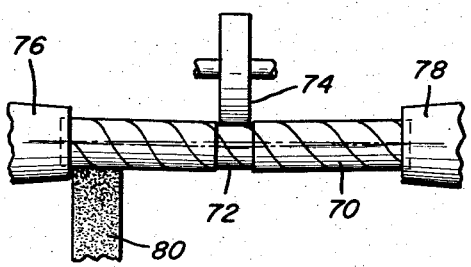
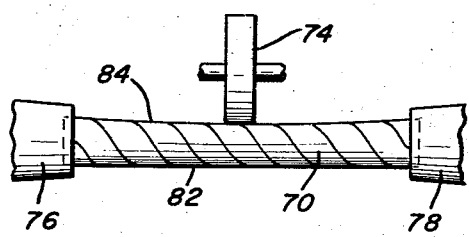
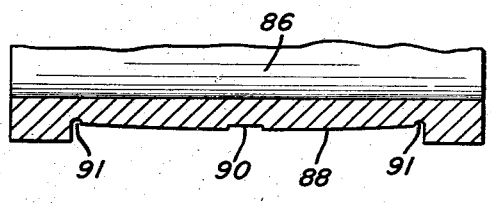
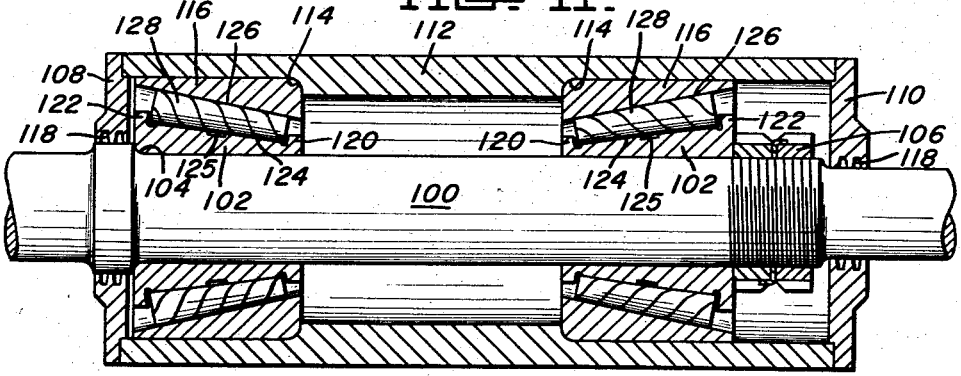
INVENTOR:
EDWIN T. LORIG,
BY: Donald G. Dalton
his Attorney.

2,859,076
                 ROLLER BEARING
             Edwin T. Lorig, Pittsburgh, Pa.
      Application September 27, 1955, Serial No. 536,857
                10 Claims. (Cl. 308—202)

This invention relates to a roller bearing and more particularly to a roller bearing which does not require the use of cages. Cageless bearings are not new since very early roller bearings were made without cages. However, the rollers of the bearing would not remain parallel to one another nor to the axis of the bearing itself. When the rollers get out of parallelism a longitudinal threading action takes place, thus causing relative axial movement between the outer race, the inner race and the complement of rollers. In an attempt to overcome this detrimental internal axial thrust the radial cageless bearings were packed with various kinds of heavy grease to continuously lubricate the contact points between successive rollers, between the rollers and races, and between the roller ends and thrust collars, thus allowing the rollers which were out of parallelism to slip into position on the races between the end thrust collars. On very short bearings this did some good but in bearings in which the rollers were relatively long with respect to their diameter, very little good was accomplished since the complement of rollers would all become crossed in the same general direction between the inner and outer races, thus subjecting the rollers to severe bending action accompanied by extraordinary high pressures between rollers and races because of the transverse curvature of the bearing surface of the inner and outer races. This bending action and resultant high internal unit pressures plus the churning action of the grease created high internal temperatures and high pressures between the rollers and the races so that the internal longitudinal threading force of the rollers was increased to the point of rupture of roller and race bearing surfaces. In some cases the internal heat generated was sufficient to set the grease in the bearing on fire. For the foregoing reasons cages were developed for roller bearings and are now used almost exclusively except for light load low speed applications. The cages are designed to maintain the rollers in parallelism and alignment with the axis of rotation of the inner race and bore of the outer race by applied torsional force. For bearings with cages to operate satisfactorily it has been necessary to reduce the length of the rollers with respect to their diameter so as to increase the torsional strength of the cages, this being detrimental for many applications. The cages must necessarily be strong because they must resist the existing detrimental torsional forces. The lubricants used in the bearings, the frictional resistance between the rollers and the cages and the resistance between the rollers and races all combine to generate internal heat at high speeds, thus limiting the speed of the shaft in the bearing. The bearings are also not suitable for use where a great amount of expansion and contraction takes place, such as with alternately heated and cooled driven rolls and shafts.

It is therefore an object of my invention to provide a cageless roller bearing in which the rollers center and align themselves under rotation and under load.

Another object is to provide such a bearing in which the wear on various parts is insignificant and which requires very little lubrication.

A further object is to provide such a bearing which can operate satisfactorily regardless of axial expansion and contraction of the shaft or other part being supported.

Still another object is to provide such a bearing which is inexpensive to manufacture because less precision is required in dimensional tolerances and because of the omission of the cages.

These and other objects will be more apparent after referring to the following specification and attached drawings, in which:

Figure 7 is a view showing one stage in the manufacture of a roller;

Figure 8 is a view of the roller of Figure 7 showing a further step in the manufacture thereof;

Figure 9 is a view showing still a further step in the manufacture of the roller of Figure 7;

Figure 10 is a view showing one stage in the manufacture of the inner race of a bearing;

Figure 11 is a sectional view of a radial bearing; and

Figure 1:
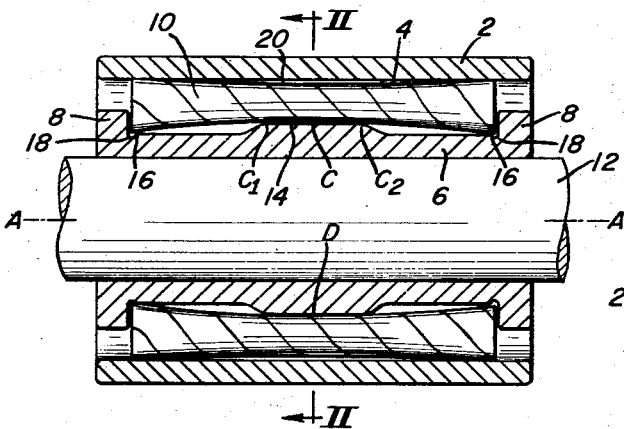
Figure 1 is a sectional view of one embodiment of my invention.
Figure 2:
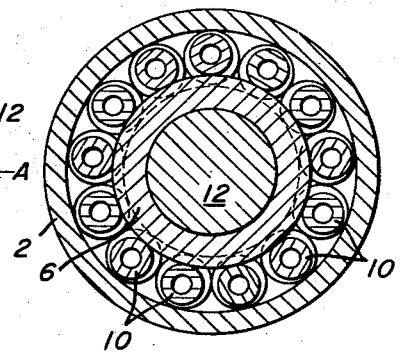
Figure 2 is a sectional view taken on the line II—II of Figure 1.

Referring more particularly to Figures 1 and 2 of the drawings, the reference numeral 2 indicates the outer race of a radial bearing. The race 2 has a cylindrical inner surface 4. An inner race 6 is provided with roller retainer flanges 8 at each end for limiting relative axial movement of rollers 10. As shown the inner surface of the inner race supports a shaft 12 having its axis A—A coincident with the axis of the inner and outer races. The outer surface of the inner race is provided with a short cylindrical portion 14 adjacent its transverse center. The portion 14 is further removed from the axis A—A than the corresponding point in a straight line extending through the ends 16 of the other surface of inner race 6. A peripheral groove 18 is preferably provided adjacent each end 16. The helically wound hollow rollers 10 have a concave outer surface 20. If desired the rollers 10 may be solid instead of being made from helically winding a strip. The average distance between the raised cylindrical surface 14 and the opposing surface of the outer race 2 is greater than the central diameter of the rollers 10, this difference preferably being only a few thousandths of an inch. In assembly the rollers 10 are first assembled as a full complement in contact with the bearing surface of the inner race 6 between the flanges 8 and this assembly is then inserted into the bore of the outer race 2. This causes the rollers 10 to be deflected outwardly intermediate their ends away from the axis A—A. In use either the inner or outer race may be rotated in either direction and the other race fixed. The concavity of the rollers 10 is only a few thousandths of an inch and may vary depending upon the length and type of rollers used. It will be seen that the rollers 10 contact each other only at their ends during rotation and this contact will occur lightly only in the unloaded zone since adjacent rollers tend to separate slightly as the load is applied. The reason for this is that greater flexure of successive rollers takes place as they enter the load zone causing the roller ends to move backward an incremental amount with respect to one another until they again emerge from the load zone. Due to the forced deflection of the rollers 10 the rotating transverse planes through the axis of rotation always remain out of parallelism with those of the inner and outer races with the rotating planes on one side of the transverse center of the rollers being at an angle with respect to the rotating planes of the other half of the rollers. This creates an automatic centering action of the rollers on the inner race and also on the outer race. Thus, very little end pressure is exerted against the flanges 8. Assuming that the load zone is at the bottom of Figure 1, the clearance between the outer race and the roller becomes slightly less at this point and the clearance between the outer race and the roller diametrically opposite is slightly increased. During rotation centrifugal force tends to throw the rollers 10 outwardly and because of the weight of each roller the initial pressure applied by the inner race 6 to obtain the required initial fixed deflection in each roller and the pressure between the inner race 6 and each roller 10 in the unloaded zone at points $C_1$ and $C_2$ becomes less and less as the speeds increase. Conversely the pressure between the outer race 2 and the ends of the rollers 10 in the unloaded zone becomes greater and greater as the speed increases. At sufficiently high rotative speed the fixed flexure initially applied in each roller 10 will be balanced by centrifugal force and overcome with a further increase in speed to a point where a further increase in flexure in each roller in the unloaded zone takes place. This increase in flexure provides greater out of parallel planar action (all planes of rotation must be perpendicular to the axis of rotation) in each roller and gives better stabilization of the bearing as a whole at high rotative speed. In addition to the foregoing a moment arm exists between the transverse center and the ends of each roller. Therefore regardless of the automatic self-centering ability of the rollers to align themselves under rotation, this moment arm during rotation will cause each roller to automatically pivot at points C and D of the inner race in a proper direction to recenter the rollers if they should contact the retainer flanges 8 which always rotate at a higher speed than the full complement of rollers at its pitch line. Thus, there is double assurance that the rollers 10 will always align and realign themselves between the inner race and the outer race with the roller end pressure against the flanges 8 remaining at an absolute minimum while the bearing is rotating under load.

Figure 3:
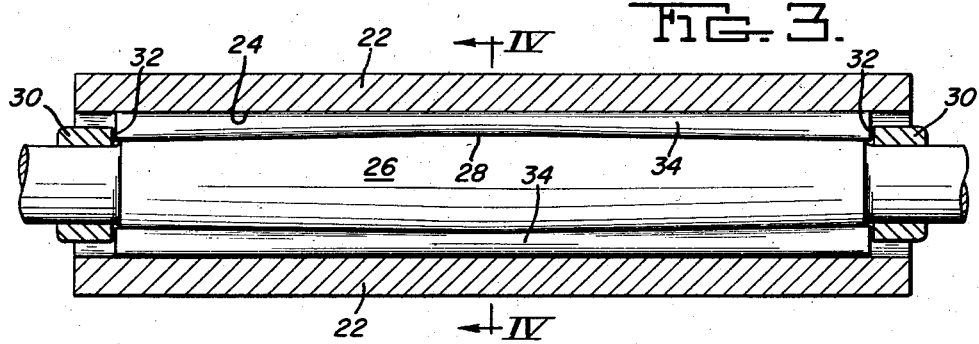
Figure 3 is a sectional view of a second embodiment of my invention.
Figure 4:
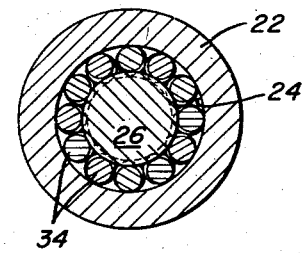
Figure 4 is a sectional view taken on line IV—IV of Figure 3.

Figures 3 and 4 disclose a slightly different embodiment of my invention in which the bearing is provided with an outer race 22 having a cylindrical inner surface 24 and an inner race in the form of a shaft 26 having a convex outer surface 28. Set collars 30 on the shaft 26 provide stops or end abutments 32 for rollers 34. The rollers 34 are solid and of sufficient flexibility to bend the slight amount required. The rollers 34 are provided with a concave outer surface in the same manner as the rollers 10. Thus, it will be seen that the construction of this bearing is essentially the same as that of Figures 1 and 2 except that the rollers are solid and the outer surface of the inner race is made up of two oppositely tapering slightly frusto-conical or convex sections. Like the bearings of Figure 1 the outer surface of the inner race has a portion adjacent its transverse center further from its axis than a corresponding point in a straight line extending through the ends of the outer surface. The rollers 34 have a much greater relative length with respect to its diameter than the rollers of Figure 1. It has been found that with this construction the rollers function better when relatively long than when relatively short.

Figure 5:
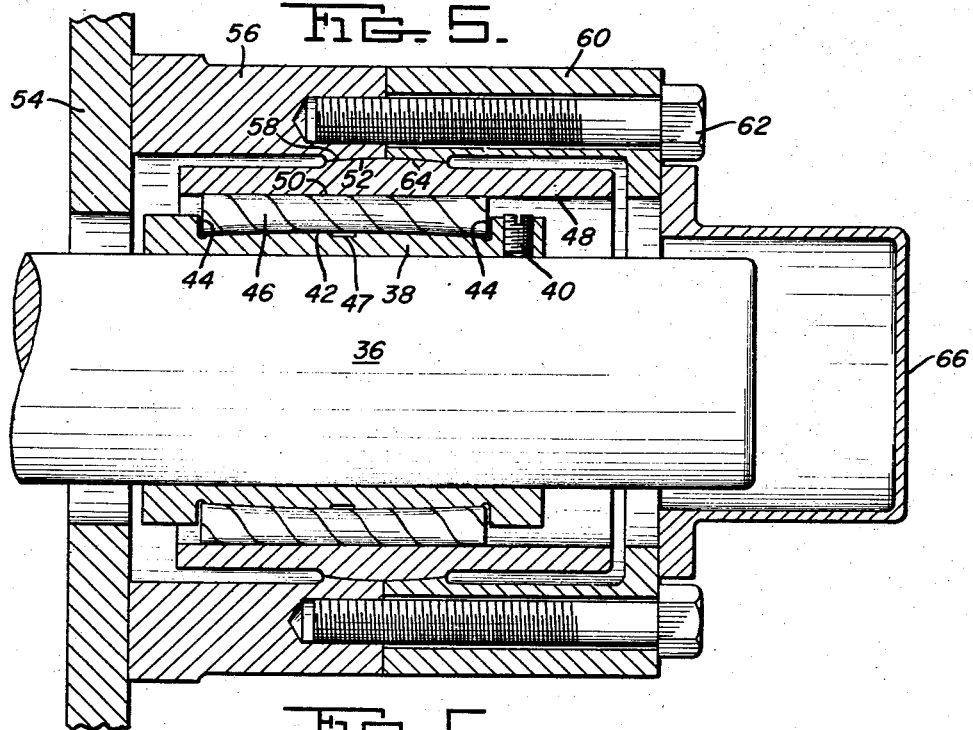
Figure 5 is a sectional view showing a bearing assembly for use with a shaft subjected to heat.
Figure 6:
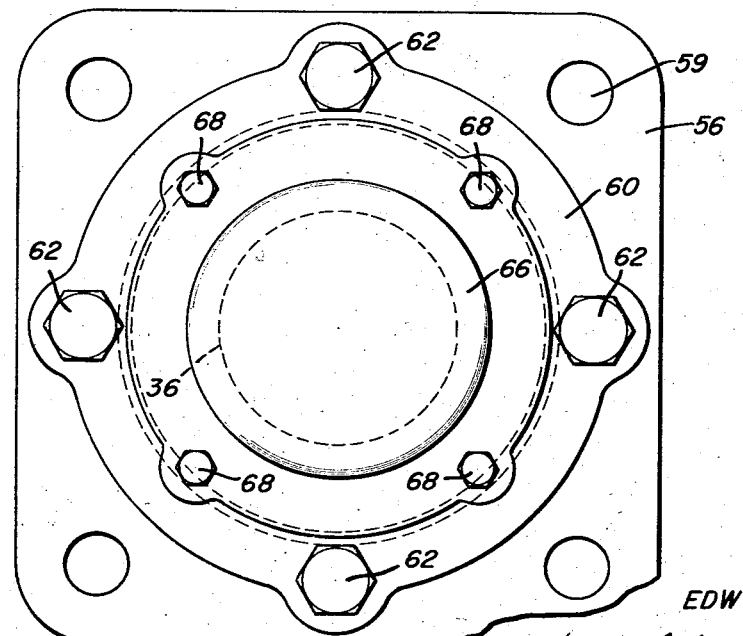
Figure 6 is an end view of the assembly of Figure 5.

Figures 5 and 6 show a bearing assembly which is particularly suitable for those installations where the shaft must move axially under expansion and contraction due to heat, this construction being particularly suitable for use with the rollers of a heating furnace. In this embodiment shaft 36 which is preferably the shaft of a roller in a furnace has an inner race 38 secured thereto as by a set screw 40. The outer surface 42 of the race 38 is convex and is provided with shoulders 44 for limiting axial movement of concave rollers 46. An annular groove 47 is preferably provided adjacent the center of the outer surface 42. Outer race 48 has a cylindrical inner surface 50 and a convex outer surface 52 which is preferably spherical. The construction of the bearing is generally the same as that of Figures 1, 2, 3 and 4. A stationary support plate 54 carries a ring 56 having a concave inner surface 58 shaped to conform to one half of surface 52. The ring 56 may be fastened to plate 54 in any suitable manner such as by welding or by bolts passing through holes 59 into matching holes in plate 54. A ring 60 is secured to the ring 56 by means of bolts 62. The ring 60 is provided with a concave surface 64 corresponding to or matching one-half of surface 52. A cover 66 is preferably attached to the ring 60 by means of bolts 68 to prevent dirt from getting into the bearings and to prevent escape of atmospheric gas from the furnace.

Figures 7 to 9 disclose a method of making the rollers. A one-half inch diameter roller 70 which may be solid or of the wound type has its ends ground square and its corners slightly rounded. A small portion 72 at the center of the roller is then ground so that its diameter is .010 inch smaller than the rest of the roller. A back rest 74 is then forced against the roller at the surface 72 so as to deflect it .005 inch as shown in Figure 8. At this time the roller 70 is gripped between drive collet 76 and tail stock 78. The roller deflected in this manner is rotated and a grinding wheel 80 is traversed back and forth in a straight line, thus giving the roller the proper contour as shown in Figure 9 where the line 82 is straight and the line 84 is curved. When the pressure is relieved from the roller 70 it will of course assume the concave shape shown in the various embodiments described above. Centerless grinding may be employed to secure the required hollowness in the rollers.

In machine grinding inner race 86, its outer surface 88 is first provided with peripheral grooves 90 and 91 as shown in Figure 10. These grooves are important in that for best operation the ends of the rollers should not contact shoulders or fillets on the inner race and the transverse center of the rollers should not contact the inner race.

Figure 11 discloses a thrust bearing constructed in accordance with my invention. In this embodiment a shaft 100 supports inner races 102 between a shoulder 104 and nut 106. Flanges 108 and 110 support an outer ring 112 having shoulders 114 for confining outer races 116. Seals 118 may be provided on the flanges 108 and 110. Inner race 102 is provided with abutments 120 and 122 with a generally frusto-conical surface 124 therebetween. The surface 124 is slightly convex with the portion adjacent its transverse center being spaced further from its axis than a corresponding line on a cone extending through the ends of the surface. A peripheral groove 125 is preferably provided in the transverse center of surface 124. The outer race 116 has a frusto-conical inner surface 126. The angle of inclination of the frusto-conical inner surface 126 is greater than the angle of inclination of the frusto-conical outer surface 124. A plurality of generally frusto-conical rollers 128 are provided between the inner and outer races. The outer surfaces of the rollers 128 are concave. The operation of this bearing is essentially the same as that of the bearings disclosed in Figures 1 to 4. Pressure exists only between the radial bearing surface of the rollers and the races. When axial loads are applied the rollers automatically adjust themselves between the inner and outer races in a manner such that a threading or screwing action occurs between the rollers and races creating an axial resisting force internally which is opposite to that of the live axial load applied to the bearings. Therefore, no undue pressure between the roller ends and the retaining collars of the inner race can exist to resist the live axial load applied.

Figure 12:
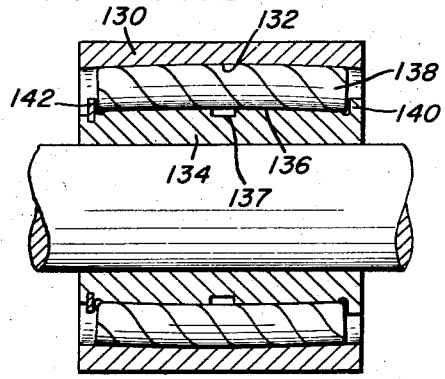
Figure 12 is a sectional view of still another embodiment of my invention.

Figure 12 discloses a further embodiment of my invention. In this embodiment outer race 130 has a concave inner surface 132 and inner race 134 has a convex outer surface 136. A peripheral groove 137 is preferably provided in the transverse center of surface 136. Cylindrical rollers 138 are provided between the inner and outer races and endwise movement is limited by means of shoulder 140 and end collar 142. While this roller functions much better than the usual cageless or cage bearing it has certain disadvantages not present in the other bearings described above.

When speaking of the transverse center of the rollers I do not mean to be limited to the exact midway point between the ends of the rollers. For example, in the embodiment of Figure 11 the groove 125 should preferably be located slightly closer to the large diameter end of the roller than to the small diameter end.

While several embodiments of my invention have been shown and described it will be apparent that other adaptations and modifications may be made without departing from the scope of the following claims.

I claim:

1. A roller bearing comprising an inner race, an outer race surrounding said inner race, and a plurality of relatively flexible rotatable rollers arranged between said inner and outer races, said rollers contacting said inner and outer races adjacent their ends, the outer surface of said inner race being so shaped that it forms each roller so that its longitudinal axis is bent with the mid-point of the axis being spaced further from the axis of the inner race than a corresponding point on a straight line extending between the ends of said longitudinal axis, said rollers being free to move with respect to one another.

2. A roller bearing according to claim 1 in which the said outer surface of said inner race has a portion adjacent its transverse center spaced further from its axis than a corresponding point on a straight line extending through the ends of said outer surface.

3. A roller bearing according to claim 2 in which the rollers have a concave outer surface and the inner surface of said outer race is cylindrical.

4. A roller bearing according to claim 1 in which the said outer surface of said inner race is convex.

5. A roller bearing according to claim 4 in which the rollers are cylindrical, the inner surface of said outer race is concave, and means are provided for limiting axial movement of said rollers.

6. A roller bearing according to claim 1 in which the said outer surface of said inner race has a narrow raised cylindrical section adjacent its transverse center, and said rollers have a concave outer surface.

7. A roller bearing according to claim 1 in which the said outer surface of said inner race has a narrow raised cylindrical section adjacent its transverse center, the inner surface of said outer race is cylindrical, the rollers have a concave outer surface, and the average distance between said raised cylindrical surface and the opposing surface of said outer race is greater than the central diameter of said rollers.

8. A roller bearing according to claim 1 in which the said outer surface of said inner race is generally frusto-conical with the portion adjacent its transverse center being spaced further from its axis than a corresponding line on a cone extending through the ends of said surface, the inner surface of said outer race being frusto-conical, the angle of inclination of the frusto-contical inner surface being greater than the angle of inclination of the frusto-conical outer surface, and said rollers being generally frusto-conical with their outer surfaces being concave.

9. A bearing assembly comprising a shaft, an inner race secured to said shaft, an outer race surrounding said inner race, a plurality of relatively flexible rotatable rollers arranged between said inner and outer races, said rollers contacting said inner and outer races adjacent their ends, the outer surface of said inner race being so shaped that it forms each roller so that its longitudinal axis is bent with the midpoint of the axis being spaced further from the axis of the inner race than a corresponding point on a straight line extending between the ends of said longitudinal axis, said rollers being free to move with respect to one another, said outer race being movable axially with respect to said inner race, means limiting axial movement of said rollers, said outer race having a convex outer surface, and a relatively stationary bearing support, said bearing support having a concave inner portion for receiving the convex outer surface of said outer race.

10. A bearing assembly according to claim 9 in which the said outer surface of said inner race has a portion adjacent its transverse center spaced further from its axis than its ends and intermediate portions, the inner surface of said outer race is cylindrical, and the rollers have a concave outer surface.

References Cited in the file of this patent

UNITED STATES PATENTS

| 572,681 | Lawson | Dec. 8, 1896 |
| 1,263,454 | Meier | Apr. 23, 1918 |
| 2,197,499 | Heinze | Apr. 16, 1940 |

FOREIGN PATENTS

| 117,835 | Switzerland | Dec. 1, 1926 |
| 511,985 | Germany | Nov. 4, 1930 |
| 337,031 | Italy | Feb. 25, 1936 |